United States Patent
Amemiya et al.

(10) Patent No.: US 6,914,606 B2
(45) Date of Patent: Jul. 5, 2005

(54) VIDEO OUTPUT CONTROLLER AND VIDEO CARD

(75) Inventors: Jiro Amemiya, Kawasaki (JP); Kouki Uesugi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/728,973

(22) Filed: Dec. 8, 2003

(65) Prior Publication Data

US 2005/0062745 A1 Mar. 24, 2005

(30) Foreign Application Priority Data

Sep. 19, 2003 (JP) ........................... 2003-328272

(51) Int. Cl.⁷ ........................... G06T 1/00; G06F 13/14
(52) U.S. Cl. ..................... 345/522; 345/502; 710/22; 710/24
(58) Field of Search ................ 345/501, 502, 345/522, 530, 531, 534, 536–538, 558; 710/1, 5, 20, 22–25, 36–40

(56) References Cited

U.S. PATENT DOCUMENTS

| | | | | |
|---|---|---|---|---|
| 5,717,952 A | * | 2/1998 | Christiansen et al. ......... 710/22 |
| 5,862,407 A | * | 1/1999 | Sriti ............................. 710/23 |
| 5,903,281 A | * | 5/1999 | Chen et al. .................. 345/504 |
| 5,905,912 A | * | 5/1999 | Story et al. ................... 710/27 |
| 6,202,106 B1 | | 3/2001 | Baxter |
| 6,651,119 B2 | * | 11/2003 | Ghodrat et al. ............... 710/40 |
| 6,678,755 B1 | * | 1/2004 | Peterson et al. .............. 710/24 |
| 2003/0046530 A1 | * | 3/2003 | Poznanovic ................. 713/100 |

FOREIGN PATENT DOCUMENTS

| | | |
|---|---|---|
| JP | 2001-84217 | 3/2001 |
| JP | 2002-132706 | 5/2002 |

* cited by examiner

*Primary Examiner*—Kee M. Tung
(74) *Attorney, Agent, or Firm*—Oblon, Spivak, McClelland, Maier & Neustadt, P.C.

(57) ABSTRACT

A video output controller has a video output buffer, a DMA controller, and a display controller. The display controller has a DMA command list processor configured to determine which of the DMA commands contained in the DMA command list must be issued, an initialize signal port configured to receive an initialize signal for starting initialization, a step signal port configured to receive a step signal for starting the issuance of the DMA command, and an external signal processor configured to provide the DMA command list processor with a timing signal for issuing a DMA command according to the initialize signal and step signal.

20 Claims, 11 Drawing Sheets

FIG. 10A
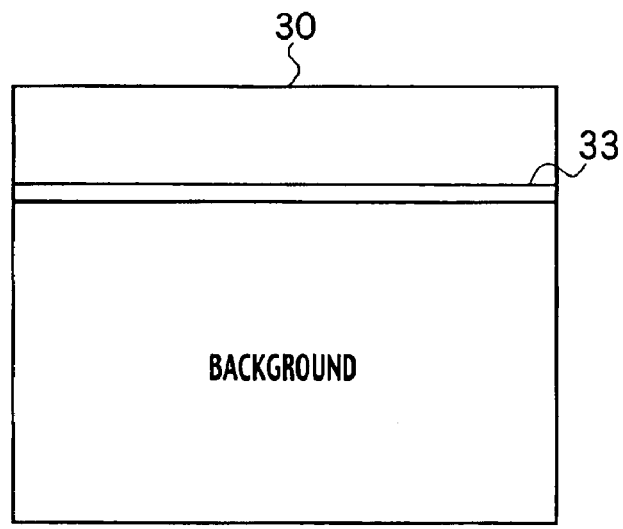
FIG. 10B
FIG. 10C
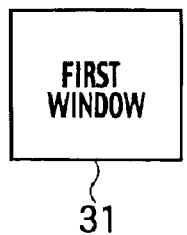 
FIG. 10D
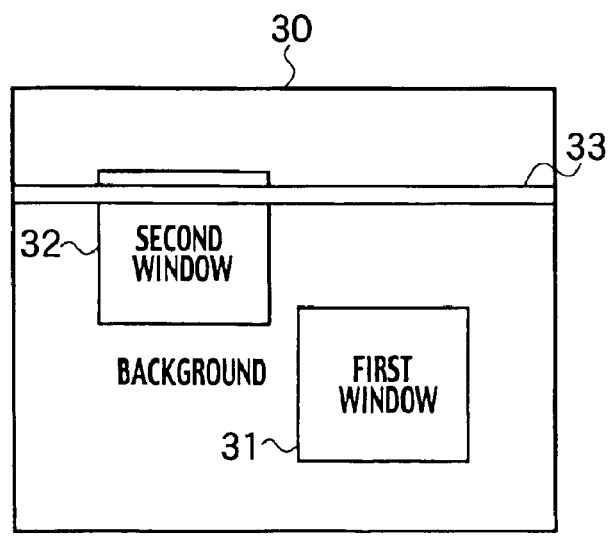

VIDEO OUTPUT CONTROLLER AND VIDEO CARD

CROSS REFERENCE TO RELATED APPLICATIONS

This application is based upon and claims the benefit of priority from the prior Japanese Patent Application No. P2003-328272 filed on Sep. 19, 2003; the entire contents of which are incorporated herein be reference.

BACKGROUND OF THE INVENTION

1. Field of the Invention

The present invention relates to a video output controller and a video card, and particularly, to a video output controller capable of programming a graphics processor.

2. Description of Related Art

Japanese Patent Laid Open Publication (Kokai) No. 2001-84217 discloses a DMA (direct memory access) circuit having a memory to store a plurality of source addresses and a source address register to hold a first one of the source addresses stored in the memory.

Japanese Patent Laid Open Publication (Kokai) No. 2002-132706 discloses a DMA transfer device having a transfer address storing unit to store a first address of a data block containing data for a plurality of lines to be DMA-transferred in response to an instruction from a CPU and a storage unit to store the number of data lines to be transferred.

Specification of U.S. Pat. No. 6202106B1 discloses an intelligent DMA controller (IDMAC) having a parameter block structure that includes an initial memory location and at least one pointer, which is based on the initial memory location, for a plurality of parameter locations (such as source addresses and destinations).

These DMA devices are constituted by hardware, and therefore, only allow a display resolution to be selected from a predetermined number of resolutions. Generally, frame buffers are secured in continuous areas in a memory, and therefore, data in the frame buffers must first be collected to form a frame when carrying out a collaborative rendering operation with, for example, a distributed shared memory computer system.

SUMMARY OF THE INVENTION

A first aspect of the present invention provides a video output controller having a first storage device configured to store a DMA command list containing DMA commands, a second storage device configured to secure frame buffers, a video output buffer, a DMA controller, and a display controller, wherein the display controller has a DMA command list processor configured to determine which of the DMA commands contained in the DMA command list must be issued, an initialize signal port configured to receive an initialize signal for starting initialization, a step signal port configured to receive a step signal for starting the issuance of the DMA command, and an external signal processor configured to provide the DMA command list processor with a timing signal for issuing a DMA command according to the initialize signal and step signal.

A second aspect of the present invention provides a video output controller having a video output buffer, a DMA controller, and a display controller, wherein the display controller has a DMA command list processor configured to determine which of the DMA commands contained in the DMA command list must be issued, an initialize signal port configured to receive an initialize signal for starting initialization, a step signal port configured to receive a step signal for starting the issuance of the DMA command, and an external signal processor configured to provide the DMA command list processor with a timing signal for issuing a DMA command according to the initialize signal and step signal.

A third aspect of the present invention provides a video card having a plurality of image processors configured to draw an image and generate image data to be stored in frame buffers, a first storage device configured to store a DMA command list containing DMA commands, a second storage device configured to secure the frame buffers, a video output buffer, a DMA controller, and a display controller, wherein the display controller has a DMA command list processor configured to determine which of the DMA commands contained in the DMA command list must be issued, an initialize signal port configured to receive an initialize signal for starting initialization, a step signal port configured to receive a step signal for starting the issuance of the DMA command, and an external signal processor configured to provide the DMA command list processor with a timing signal for issuing a DMA command according to the initialize signal and step signal.

BRIEF DESCRIPTION OF THE DRAWINGS

FIG. 10A is a view showing a background according to a modification of the second embodiment;

FIG. 10B is a view showing a first window according to the modification of the second embodiment;

FIG. 10C is a view showing a second window according to the modification of the second embodiment;

FIG. 10D is a view showing an example of a screen in which the first and second windows are superposed on the background;

DETAILED DESCRIPTION OF EMBODIMENTS

Figure 1:
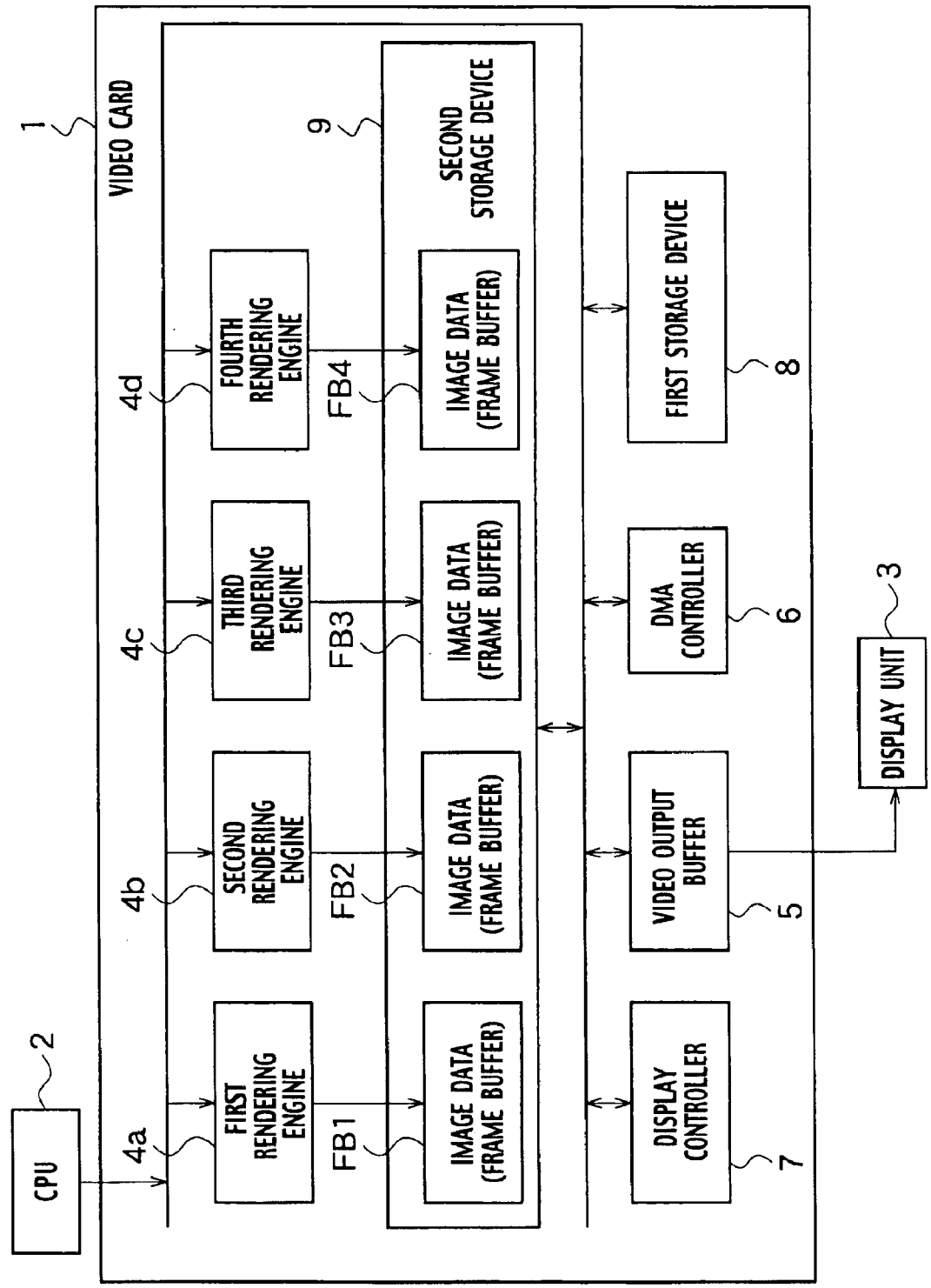
FIG. 1 is a block diagram showing a video card according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIRST EMBODIMENT

FIG. 1 shows a video card 1 according to the first embodiment of the present invention. The video card 1 has a plurality of image processors (such as rendering engines) 4a to 4d to draw an image and generate image data to be stored in frame buffers FB1 to FB4, a first storage device 8 to store a DMA command list, a second storage device 9 to secure the frame buffers FB1 to FB4, a display controller 7 to control output to a display unit 3, a video output buffer 5, and a DMA controller 6.

Figure 2:
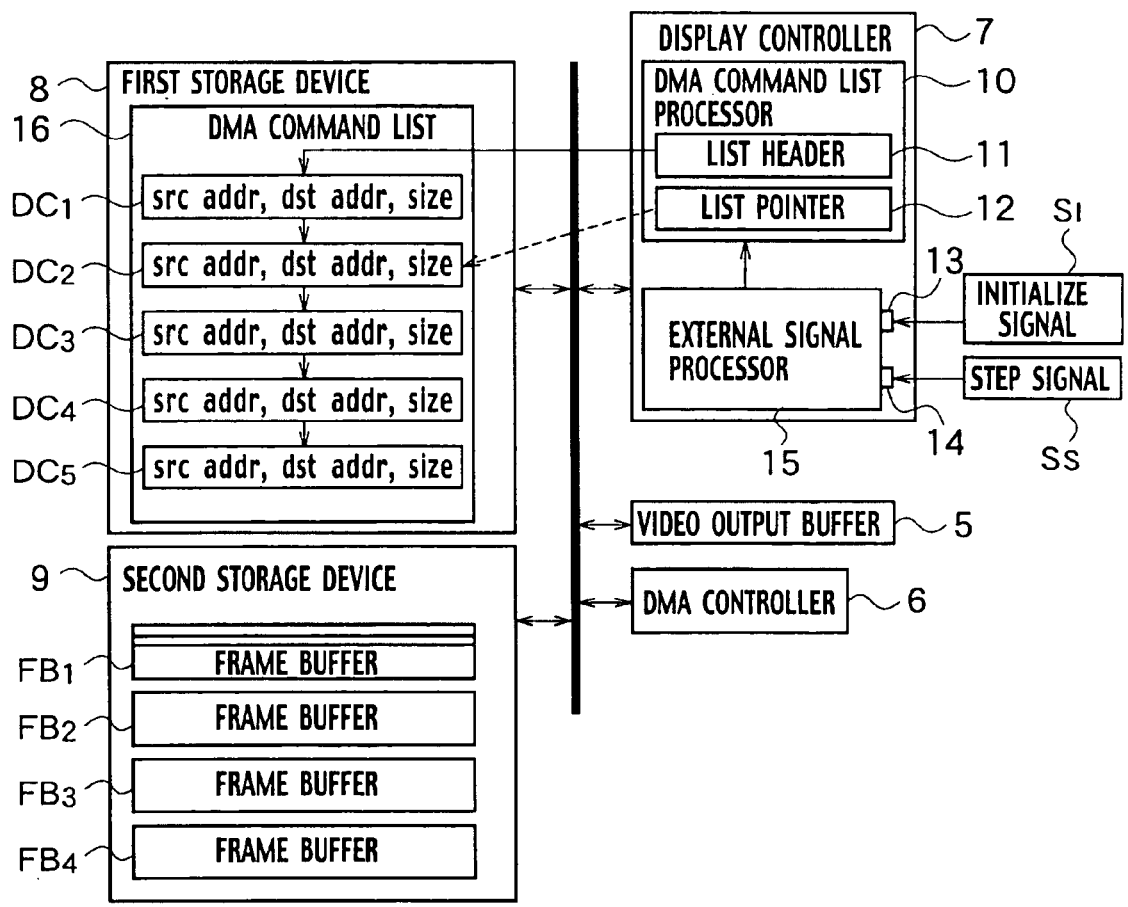
FIG. 2 is a block diagram showing a part of the video card of FIG. 1 corresponding to a video output controller.

FIG. 2 shows a part of the video card 1 shown in FIG. 1 corresponding to a video output controller. The video output controller includes the first storage device 8 to store the DMA command list 16, the second storage device 9 to keep the frame buffers FB1 to FB4, the video output buffer 5, the DMA controller 6, and the display controller 7. The DMA command list 16 includes a plurality of DMA commands DC1 to DC5 each containing a source address (src addr), a destination address (dst addr), and the size (size) of data to be transferred from a frame buffer. The display controller 7 includes a DMA command list processor 10 to determine which of the DMA commands DC1 to DC5 is issued, an initialize signal port 13 to receive an initialize signal SI for starting initialize, a step signal port 14 to receive a step signal Ss for starting the issuance of the DMA commands DC1 to DC5, and an external signal processor 15 to provide, in accordance with the initialize signal SI and step signal Ss, the DMA command list processor 10 with a timing signal for issuing the DMA commands DC1 to DC5. The DMA command list processor 10 includes a list header 11 to hold a start position of the DMA command list 16 and a list pointer 12 to hold the position of a DMA command to be issued next. The initialize signal SI corresponds to a so-called V-sync signal, and the step signal Ss to a so-called H-sync signal. The display controller 7 receives the initialize signal SI and step signal Ss.

The external signal processor 15 generates a timing signal for the DMA command list processor 10 in response to the initialize signal SI and step signal Ss. More precisely, the external signal processor 15 detects drawing completion timing and provides an initialize timing signal to the DMA command list processor 10. Also, the external signal processor 15 provides a DMA command issuance timing signal in response to an external signal.

The DMA command list processor 10 picks up a proper one of the DMA commands DC1 to DC5 from the DMA command list 16 stored in the first storage device 8 and transfers the DMA command to the DMA controller 6. Namely, the DMA command list processor 10 issues a DMA command to the DMA controller 6 according to information from the external signal processor 15.

The DMA controller 6 receives the DMA commands DC1 to DC5 directly from the display controller 7. Alternatively, the DMA controller 6 indirectly receives the DMA commands DC1 to DC5 with the use of a pointer. In this case, the DMA controller 6 reads the DMA commands DC1 to DC5 from the first storage device 8 according to the pointer. Based on the read DMA commands, the DMA controller 6 carries out block transfer. Each of the DMA commands DC1 to DC5 stored in the first storage device 8 and activated in a given step may consist of a plurality of DMA commands.

The video output buffer 5 receives image data from the frame buffers FB1 to FB4 and temporarily stores the image data for video output. The video output buffer 5 usually has a capacity to keep data for one line.

The first storage device 8 may be a memory to be directly accessed by the display controller 7 at high speed, or an area secured in the second storage device 9. The elements (DMA commands DC1 to DC5) of the DMA command list 16 have each DMA command data and a pointer for DMA command data to be issued in response to next reception of the step signal Ss. To update the list pointer 12, the list pointer 12 is rewritten with a pointer for DMA command data. The elements of the DMA command list have an identical size and are aligned in order of activation. Updating the list pointer 12 equates to adding the size of an element of the DMA command list 16 to the list pointer 12.

The second storage device 9 is preferably an internal DRAM such as an embedded DRAM.

Figure 3:
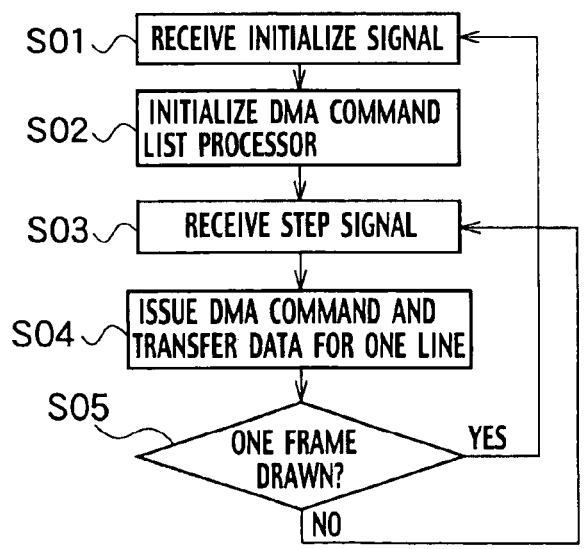
FIG. 3 is a flowchart showing a basic operation of the video output controller of FIG. 2.

A basic operation of the video output controller will be explained with reference to FIG. 3.

(a) In step S01, the initialize signal port 13 receives the initialize signal SI (V-sync) to start initialization. In step S02, the DMA command list processor 10 is initialized. More precisely, the DMA command list processor 10 copies a start position held in the list header 11 to the list pointer 12. Namely, the DMA command list processor 10 loads a DMA command list start address stored in the list header 11 to the list pointer 12.

(b) In step S03, the step signal port 14 receives the step signal Ss to start issuing the DMA commands DC1 to DC5. In step S04, the display controller 7 transfers the DMA commands DC1 to DC5 to the DMA controller 6. According to the DMA commands DC1 to DC5, the DMA controller 6 transfers image data from the frame buffers FB1 to FB4 of the second storage device 9 to the video output buffer 5. Namely, the display controller 7 sends the DMA commands DC1 to DC5 to the DMA controller 6 to conduct block transfer. In practice, the DMA controller 6 transfers data for one line to the video output buffer 5. In more detail, when the step signal port 14 receives the step signal Ss, the DMA command list processor 10 issues the DMA commands DC1 to DC5 specified by the list pointer 12 and updates the list pointer 12 according to predetermined rules.

(c) Step S05 determines whether or not a frame has completely been drawn. When the frame has been drawn (Yes in step S05), the flow returns to step S01, and the initialize signal port 13 waits for the initialize signal SI (V-sync) to start initialization and draw a new frame. When the frame has not been drawn yet (No in step S05), the step signal port 14 waits for the step signal Ss to start issuing the DMA commands DC1 to DC5.

Figure 4:
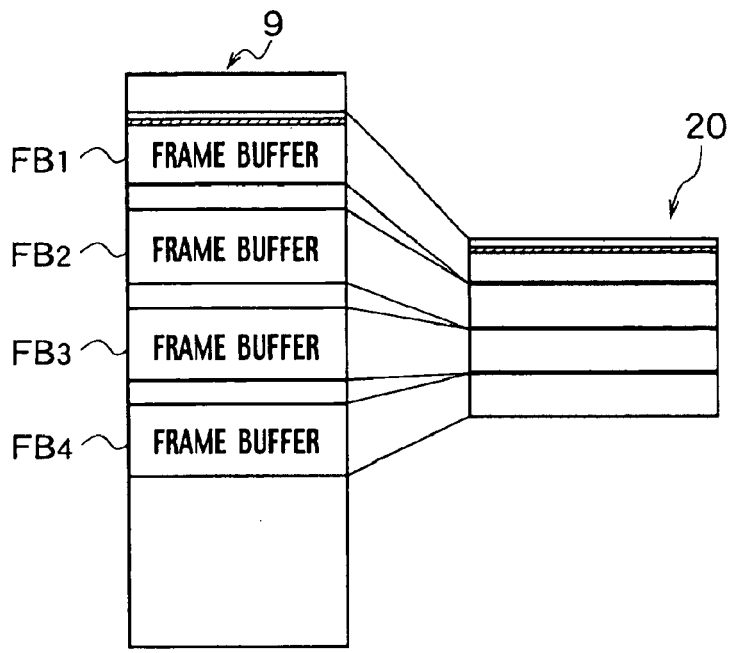
FIG. 4 is a view showing a state of outputting data from a plurality of frame buffers to a screen under the control of the video output controller of FIG. 2.

In this way, the DMA commands DC1 to DC5 to instruct frame data transfer can freely be defined in the first storage device 8 by application. Even if the frame buffers FB1 to FB4 can freely distributed in the second storage device 9 as shown in FIG. 4 according to distributed rendering, image data in the frame buffers FB1 to FB4 can be displayed on an output screen 20 of the display unit 3 of FIG. 1 without collecting the frame buffers FB1 to FB4 to one location.

Since the frame buffers FB1 to FB4 can freely be distributed in the second storage device 9, a memory space used in the second storage device 9 can be minimized.

The video card 1 or the video output controller operates in response to the initialize signal SI and step signal Ss that are externally provided. This results in suppressing distortion of images displayed on the output screen 20.

In this way, the first embodiment of the present invention is capable of outputting image data stored in the frame buffers FB1 to FB4 distributed in the second storage device 9 without collecting the frame buffers FB1 to FB4 in one location. This improves the degree of freedom of rendering conducted by application and provides, with a smaller memory space, the same effect as the related art that must collect the frame buffers to one location. According to the related art, the functions of the video output controller such as a CRT control function have been entirely realized by hardware. The first embodiment allows some of the functions to be replaced with software and a display resolution to be freely changed to another. The first embodiment can flexibly cope with frame buffers distributed in a memory.

An example of the display unit 3 is a CRT display unit, a liquid crystal display unit, or a plasma display unit. The display controller 7 of FIG. 2 is applicable to a controller (for example, a CRT controller) of these display units.

MODIFICATION OF FIRST EMBODIMENT

The initialize signal (V-sync) and step signal (H-synch) are periodical signals. The initialize signal SI is activated at the intervals of a predetermined number of activations of the step signal Ss. A modification of the first embodiment of the present invention employs a counter to count the number of times of reception of the step signal Ss at the external signal processor 15.

Figure 5:
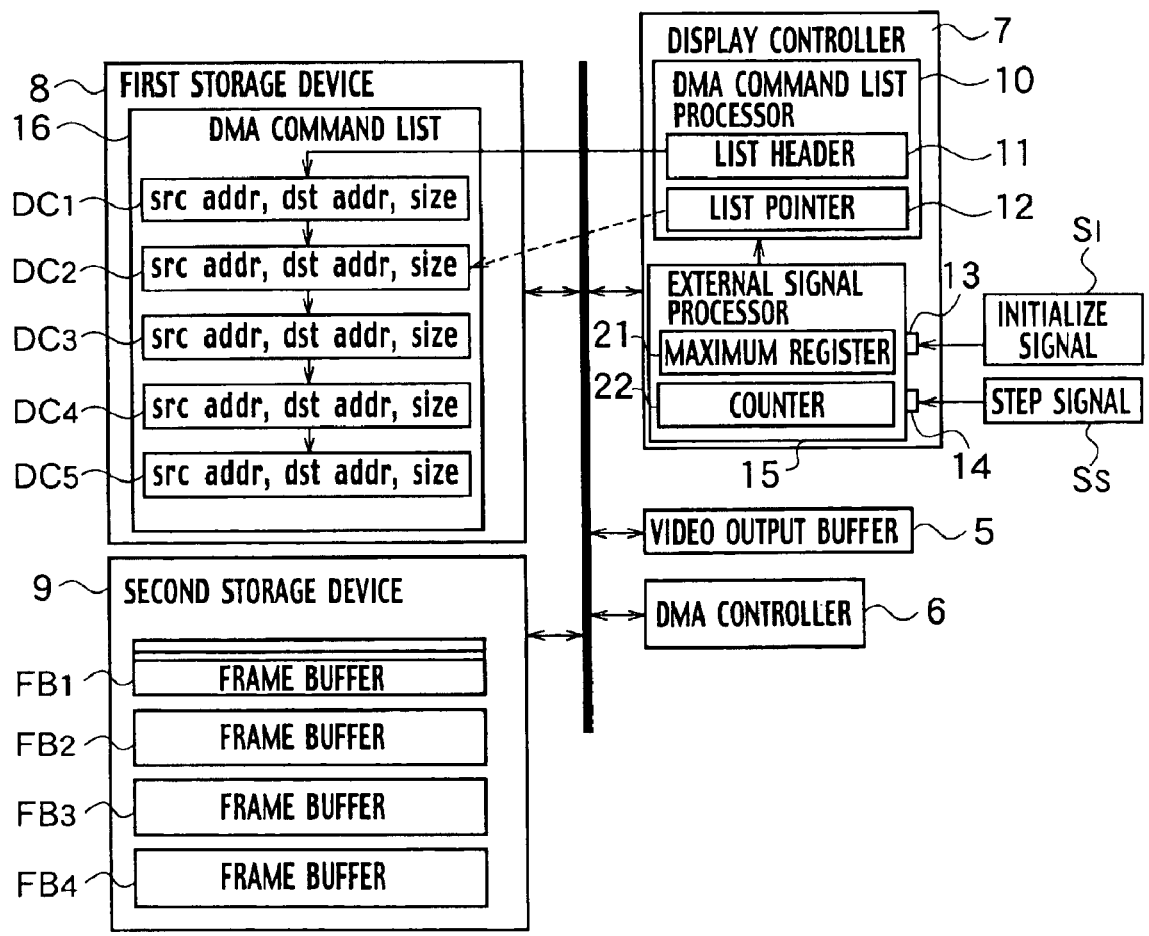
FIG. 5 is a block diagram showing a video output controller according to a modification of the first embodiment.

FIG. 5 shows a video output controller according to the modification of the first embodiment. The video output controller has a first storage device 8 having a DMA command list 16, a second storage device 9 to secure frame buffers FB1 to FB4, a video output buffer 5, a DMA controller 6, and a display controller 7. The DMA command list 16 includes a plurality of DMA commands DC1 to DC5. The display controller 7 includes a DMA command list controller 10 to determine which of the DMA commands DC1 to DC5 must be issued, an initialize signal port 13 to receive an initialize signal SI for starting initialization, a step signal port 14 to receive a step signal Ss for starting the issuance of the DMA commands DC1 to DC5, and an external signal processor 15 to provide the DMA command list processor 10 with a timing signal for issuing the DMA commands DC1 to DC5 according to the initialize signal SI and step signal Ss. The DMA command list processor 10 includes a list header 11 to keep a start position of the DMA command list 16 and a list pointer 12 to keep the position of a DMA command to be issued next.

The external signal processor 15 has a counter 22 to count the number of times of reception of the step signal Ss and a maximum register 21 to beforehand store the number of steps in which drawing is completed. When the number of times reception of the step signal Ss becomes equal to the number stored in the maximum register 21, the external signal processor 15 sends an initialize timing signal to the DMA command list processor 10. The number stored in the maximum register 21 corresponds to a maximum number of times of reception of the step signal Ss in each frame.

When the number of times of reception of the step signal Ss for a given frame reaches the maximum number, the external signal processor 15 checks to see when the initialize signal SI is received. When no initialize signal SI is received, the external signal processor 15 sends an interrupt to a higher system to notify of the inconsistency.

In this way, the modification of the first embodiment counts the number of times of reception of the step signal Ss in every frame, in order to correctly display images.

In addition, the modification provides the same effects as the first embodiment.

SECOND EMBODIMENT

The second embodiment of the present invention vertically divides an output screen 20 of a display unit 3 and distributes frame buffers corresponding to the divided parts of the screen in a memory.

Figure 6:
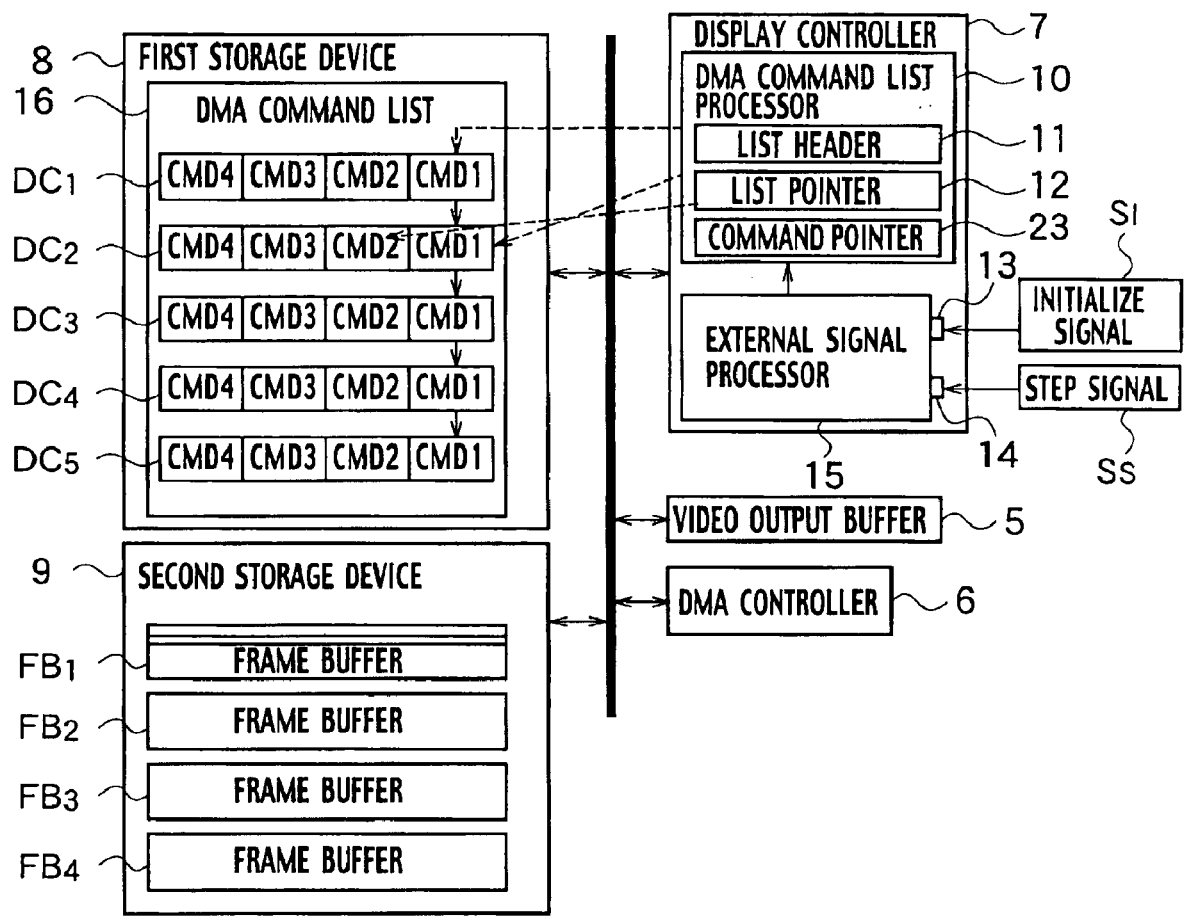
FIG. 6 is a block diagram showing a video output controller according to a second embodiment of the present invention.

FIG. 6 shows a video output controller according to the second embodiment. The video output controller includes a first storage device 8 having a DMA command list 16, a second storage device 9 securing frame buffers FB1 to FB4, a video output buffer 5, a DMA controller 6, and a display controller 7. The DMA command list 16 includes a plurality of DMA command groups DC1 to DC5. The display controller 7 includes a DMA command list processor 10 to determine which of the DMA command groups DC1 to DC5 must be issued, an initialize signal port 13 to receive an initialize signal SI for starting initialization, a step signal port 14 to receive a step signal Ss for starting the issuance of the DMA command groups DC1 to DC5, and an external signal processor 15 to provide the DMA command list processor 10 with a timing signal for issuing the DMA command groups DC1 to DC5 according to the initialize signal SI and step signal Ss.

Each of the DMA command groups DC1 to DC5 to be issued in response to the step signal Ss contains a plurality of DMA commands CMD1 to CMD4. Namely, one time of reception of the step signal Ss starts to issue a plurality of DMA commands CMD1 to CMD4. The details of the structure of the DMA command groups DC1 to DC5 will be explained later with reference to FIG. 9.

The DMA command list processor 10 has a list header 11 to keep a start position of the DMA command list 16, a list pointer 12 to keep a position of a DMA command group to be issued next, and a command pointer 23 to follow DMA commands CMD1 to CMD4 to be activated by the step signal Ss. Upon receiving the step signal Ss, the list pointer 12 switches a DMA command group to be activated to another among the DMA command groups DC1 to DC5. The command pointer 23 switches a DMA command to be activated by the step signal Ss to another among the DMA commands CMD1 to CMD4.

Figure 7:
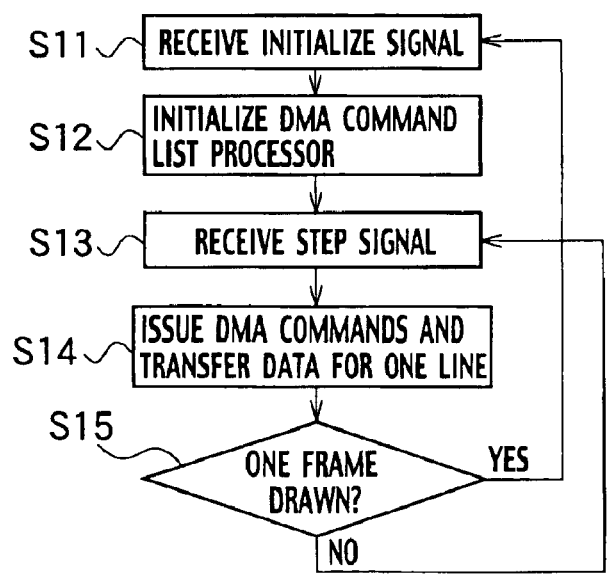
FIG. 7 is a flowchart showing a basic operation of the video output controller of FIG. 6.

A basic operation of the video output controller of FIG. 6 will be explained with reference to FIG. 7.

(a) In step S11, the initialize signal port 13 receives the initialize signal SI for starting initialization. In step S12, the DMA command list processor 10 is initialized. More precisely, the DMA command list processor 10 copies the start position kept in the list header 11 to the list pointer 12.

(b) In step S13, the step signal port 14 receives the step signal Ss for starting the issuance of the DMA command groups DC1 to DC5. In step S14, the display controller 7 transfers the DMA command groups DC1 to DC5 to the DMA controller 6. According to the DMA command groups DC1 to DC5, the DMA controller 6 transfers image data from the frame buffers FB1 to FB4 in the second storage device 9 to the video output buffer 5. Namely, the display controller 7 sends the DMA command groups DC1 to DC5 to the DMA controller 6, to conduct block transfer. In practice, the DMA controller 6 transfers data for one line to the video output buffer 5. In more detail, when the step signal port 14 receives the step signal Ss, the DMA command list processor 10 issues the DMA commands CMD1 to CMD4 contained in one of the DMA command groups DC1 to DC5 specified by the list pointer 12 and updates the list pointer 12 according to predetermined rules. The DMA commands CMD1 to CMD4 issued in response to one time of reception of the step signal Ss are simultaneously or sequentially transferred to the DMA controller 6. According to the second embodiment, transfer order and activation order of the DMA commands CMD1 to CMD4 are not particularly fixed. The DMA commands CMD1 to CMD4 may be activated and processed in parallel, or may be activated in order of transfer.

(c) Step S15 determines whether or not a frame has been drawn. When the frame has been frame (Yes in step S15), the flow returns to step S11, and the initialize signal port 13 waits for the initialize signal SI (V-synch) for starting the initialization and drawing of a new frame. When the frame has not been drawn yet (No in step S15), the flow returns to step S13, and the step signal port 14 waits for the step signal Ss for starting the issuance of the DMA command groups DC1 to DC5.

Figure 8:
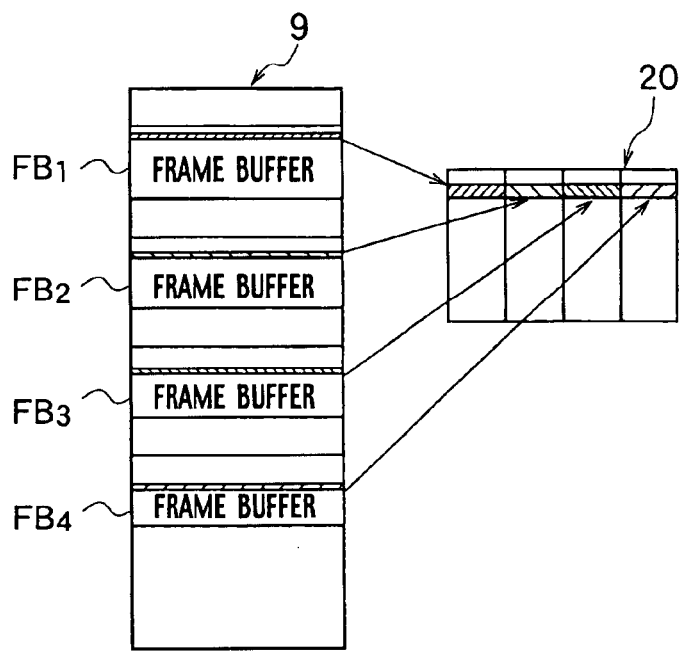
FIG. 8 is a view showing a state of outputting data from a plurality of frame buffers to a screen under the control of the video output controller of FIG. 6.

In FIG. 8, the output screen 20 of the display unit 3 is vertically divided, and the frame buffers FB1 to FB4 corresponding to the divided parts of the output screen 20 are distributed in the second storage device 9. With this configuration, the second embodiment can transport image data to the output screen 20 without collecting the frame buffers FB1 to FB4 to one location.

The second embodiment allows the frame buffers FB1 to FB4 to freely be distributed in the second storage device 9. This results in minimizing a memory space to be used in the second storage device 9.

The video card 1 or the video output controller according to the second embodiment operates in response to the initialize signal SI and step signal Ss that are externally provided. This results in suppressing distortion of images displayed on the output screen 20.

In this way, the second embodiment of the present invention is capable of outputting image data stored in the frame buffers FB1 to FB4 distributed in the second storage device 9 without collecting the frame buffers FB1 to FB4 to one location. This improves the degree of freedom of rendering conducted by application and provides, with a smaller memory space, the same effect as the related art that must collect the frame buffers to one location. According to the related arts, the functions of the video output controller have been entirely realized by hardware. The second embodiment allows some of the functions to be replaced with software and a display resolution to be freely changed to another. The second embodiment can flexibly cope with frame buffers distributed in a memory.

An example of the display unit 3 is a CRT display unit, a liquid crystal display unit, or a plasma display unit. The display controller 7 of FIG. 6 is applicable to a controller (for example, a CRT controller) of these display units.

Figure 9:
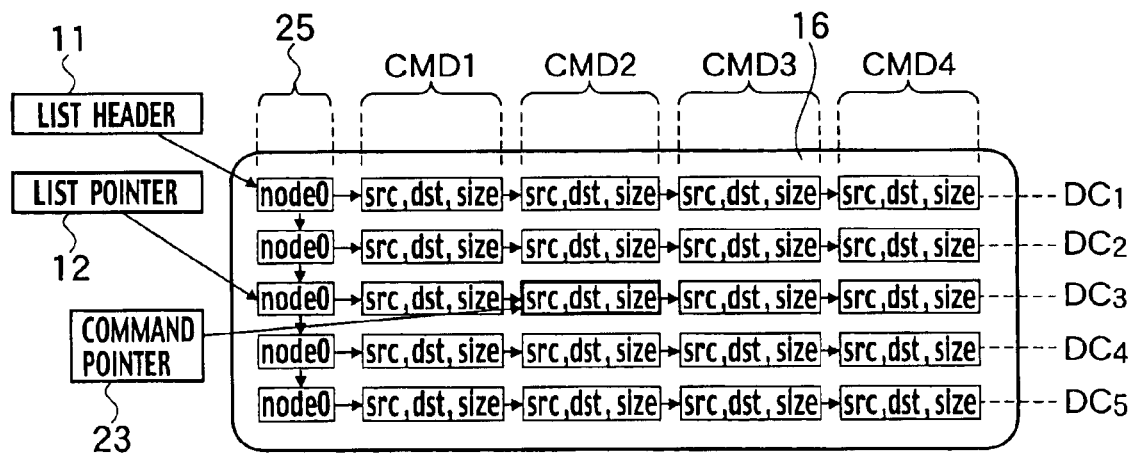
FIG. 9 is a block diagram showing the details of a structure of DMA command groups shown in FIG. 6.

As shown in FIG. 9, the DMA command list 16 has a hierarchical structure consisting of a plurality of levels. Namely, the DMA command list 16 includes a plurality of DMA command groups DC1 to DC5. Each of the DMA command groups DC1 to DC5 includes a plurality of DMA commands CMD1 to CMD4 and a node 25. The list pointer 12 indicates a first level node, for examples, the node 25 of the DMA command group DC3. When the DMA command groups DC1 to DC5 are issued, the DMA commands CMD1 to CMD4 that follow the node 25 of the DMA command group DC4 whose level is lower than the level of the DMA command group DC3 indicated with the list pointer 12 are activated. The list header 11 holds a start position, i.e., the node 25 of the DMA command group DC1 in the DMA command list 16. The list pointer 12 keeps the position of the node 25 of the DMA command group DC3 to be issued next. The command pointer 23 follows DMA commands CMD1 to CMD4 to be activated in response to the step signal Ss.

MODIFICATION OF SECOND EMBODIMENT

A method of displaying window images generated through a plurality of processes on a single screen according to a modification of the second embodiment will be explained. The modification superposes first and second windows 31 and 32 of FIGS. 10B and 10C on a background of FIG. 10A and displays them in a single frame as shown in FIG. 10D.

According to the second embodiment of FIG. 9, the DMA command groups DC1 to DC5 activated in response to the step signal Ss have an identical number of DMA commands CMD1 to CMD4. On the other hand, the modification of the second embodiment provides DMA command groups with different numbers of DMA commands depending on windows to be superposed. Namely, a part (line) 33 where the first and second windows 31 and 32 are displayed over the background 30 needs additional DMA commands to display the first and second windows 31 and 32.

Figure 11:
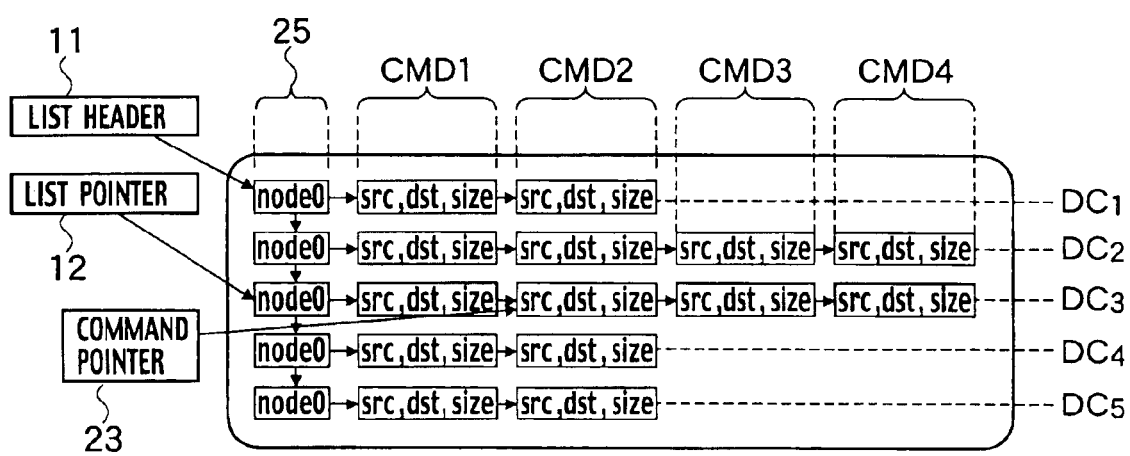
FIG. 11 is a block diagram showing the details of a structure of DMA command groups according to the modification of the second embodiment.

In FIG. 11, DMA command groups DC1, DC4, and DC5 need to display only the background 30, and therefore, each of them contains a node 25 and DMA commands CMD1 and CMD2. On the other hand, DMA command groups DC2 and DC3 must display the first and second windows 31 and 32 over the background 30, and therefore, each of them contains a node 25 and DMA commands CMD1 to CMD4.

Unlike the second embodiment of FIG. 9, the modification of FIG. 11 must maintain the order in issuing the DMA commands CMD1 to CMD4. Namely, the background 30 must be transferred first and then the first and second windows 31 and 32 to be written over the background 30. Accordingly, a command pointer 23 must follow the DMA commands CMD1 to CMD4 in this order.

THIRD EMBODIMENT

The third embodiment according to the present invention enlarges and reduces images.

Figure 12:
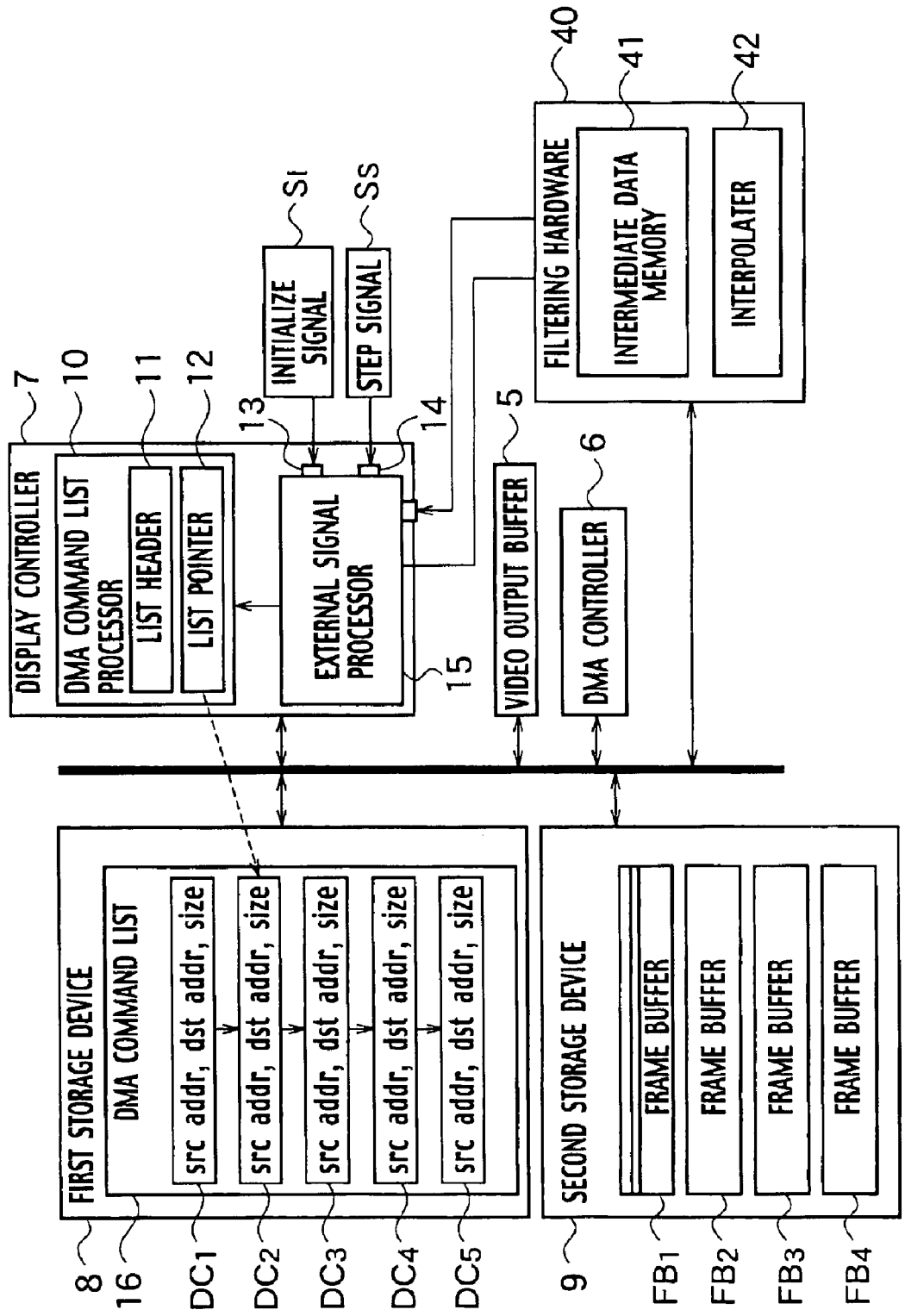
FIG. 12 is a block diagram showing a video output controller according to a third embodiment of the present invention.

FIG. 12 shows a video output controller according to the third embodiment. This video output controller includes a first storage device 8 having a DMA command list 16, a second storage device 9 to secure frame buffers FB1 to FB4, a video output buffer 5, a DMA controller 6, a display controller 7, and filtering hardware 40 to conduct filtering for image enlargement and reduction. The filtering hardware 40 includes an intermediate data memory 41 and an interpolater 42. The DMA command list 16 contains a plurality of DMA commands DC1 to DC5. The display controller 7 has a DMA command list processor 10, an initialize signal port 13, a step signal port 14, and an external signal processor 15. The DMA command list processor 10 has a list header 11 and a list pointer 12.

Compared with the video output controller of FIG. 2, the video output controller according to the third embodiment additionally has the filtering hardware 40.

With reference to FIGS. 13 to 16, techniques of enlarging and reducing images with the use of the video output controller of FIG. 12 will be explained.

Figure 13:
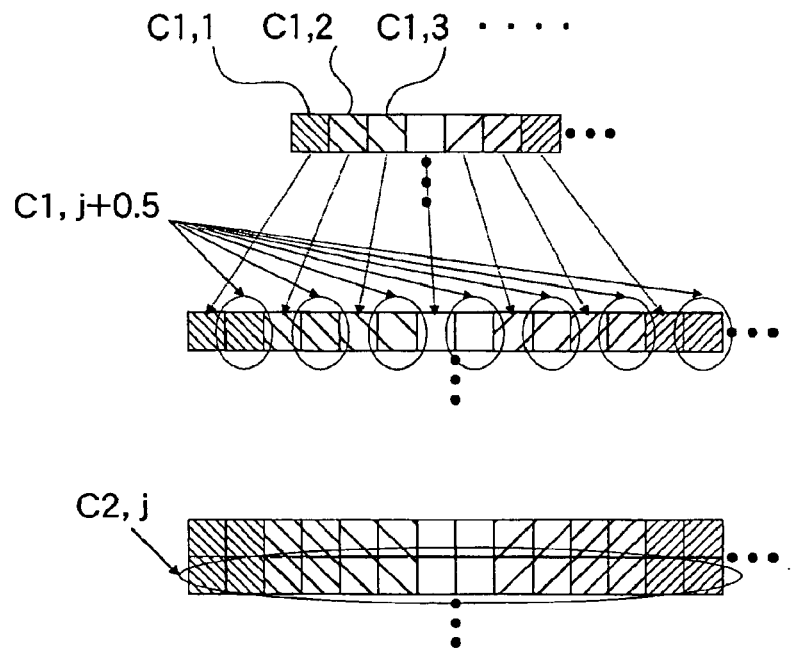
FIG. 13 is a view showing a simple algorithm for vertical-horizontal double enlargement.

FIG. 13 shows a simple algorithm to double an image in vertical and horizontal directions. An upper part of FIG. 13 shows a line of pixels before double enlargement, a middle part of FIG. 13 shows a line of pixels after double enlargement in a horizontal direction, and a lower part of FIG. 13 shows lines of pixels after double enlargement in a vertical direction. Although this example relates to double enlargement, the same technique is applicable to enlargement with any integer multiple. In FIG. 13, a line of pixels $C_{1,1}$, $C_{1,2}$, $C_{1,3}$, . . . is transferred to the intermediate data memory 41 of the filtering hardware 40, to conduct a horizontal enlarging process on the line of pixels. More precisely, as shown in the upper and middle parts of FIG. 13, an intermediate pixel $C_{1,j+0.5}$ is produced between adjacent ones of the pixels $C_{1,1}$, $C_{1,2}$, $C_{1,3}$, . . . in the line. The color of the left pixel is copied to generate the color of the intermediate pixel $C_{1,j+0.5}$. After the completion of the horizontal enlarging process, the line $C_{1,j}$ is transferred twice to the video output buffer 5 to conduct a vertical enlarging process that forms lines $C_{1,j}$ and $C_{2,j}$ as shown in the lower part of FIG. 13.

Figure 14:
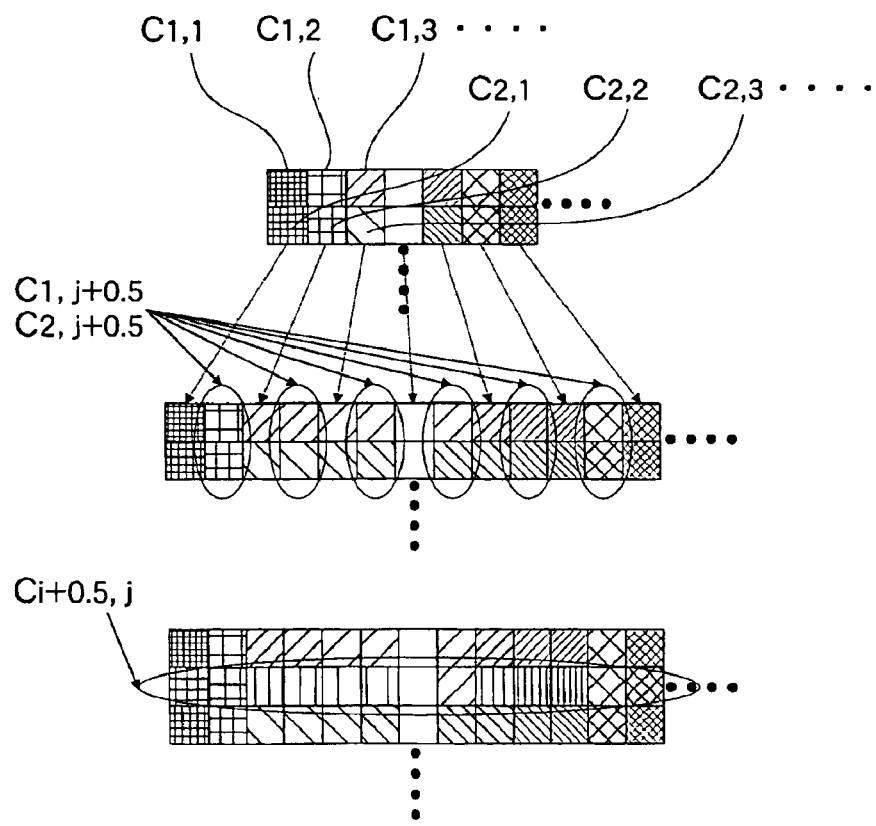
FIG. 14 is a view showing a bi-linear algorithm for vertical-horizontal double enlargement.

FIG. 14 shows a bi-linear algorithm to double an image in vertical and horizontal directions. Compared with the technique of FIG. 13, an improvement in the quality of images is expected according to the technique of FIG. 14. An upper part of FIG. 14 shows lines of pixels before double enlargement, a middle part of FIG. 14 shows lines of pixels after horizontal double enlargement, and a lower part of FIG. 14 shows lines of pixels after vertical double enlargement. Although this example relates to double enlargement, the same technique is applicable to enlargement with any multiple. In FIG. 14, a first line of pixels $C_{1,1}$, $C_{1,2}$, $C_{1,3}$, . . . is transferred to the intermediate data memory 41 to conduct a horizontal enlarging process on the first line according to an expression (1) mentioned below. More precisely, as shown in the upper and middle parts of FIG. 14, an intermediate pixel $C_{1,j+0.5}$ is generated between adjacent ones of the pixels $C_{1,1}$, $C_{1,2}$, $C_{1,3}$, . . . in the first line. At this time, the value of the intermediate pixel $C_{1,j+0.5}$ is obtained from the adjacent pixels according to linear interpolation. In the case of double enlargement, an average of the adjacent two pixels $C_{1,j}$ and $C_{1,j+1}$ is simply calculated. Next, pixels $C_{2,1}$, $C_{2,2}$, $C_{2,3}$, . . . of a second line are transferred to the intermediate data memory 41, and the horizontal enlarging process is conducted on the second line according to an expression (2).

$$C_{i,j+0.5} = (C_{i,j} + C_{i,j+1})/2 \quad (1)$$

$$C_{i+1,j+0.5} = (C_{i+1,j} + C_{i+1,j+1})/2 \quad (2)$$

Thereafter, vertical enlargement is conducted between the first-line pixels $C_{1,1}$, $C_{1,2}$, $C_{1,3}$, . . . and the second-line pixels $C_{2,1}$, $C_{2,2}$, $C_{2,3}$, . . . More precisely, as shown in the lower part of FIG. 14, linear interpolation is carried out between vertically corresponding pixels of the first and second lines to generate an intermediate pixel $C_{i+0.5,j}$. Next, the first line and the intermediate line corresponding to a "1.5"th line are transferred to the video output buffer 5. Then, a third line of an original image is transferred to the intermediate data memory 41 to similarly conduct the horizontal enlargement and vertical enlargement by generating intermediate pixels. Repeating these processes completes the vertical-horizontal double enlargement.

Figure 15A:
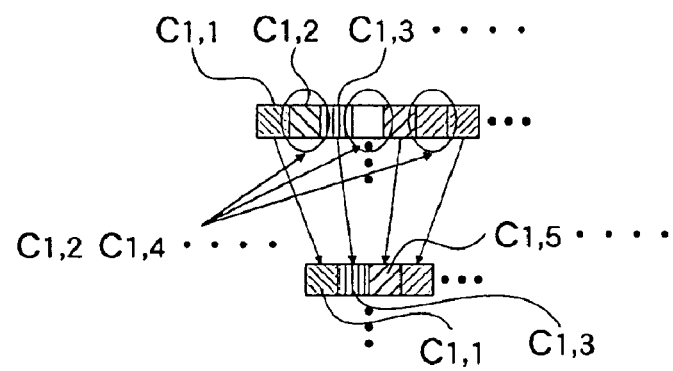
FIG. 15A is a view showing a simple algorithm for horizontal ½ reduction.

FIG. 15A shows a simple algorithm to reduce ½ times an image in vertical and horizontal directions. An upper part of FIG. 15A shows a line of pixels before horizontal ½ reduction and a lower part of FIG. 15A shows a line of pixels after the horizontal ½ reduction. Although this example relates to ½ reduction, the same technique is applicable to reducing "1/integer" times an image. In FIG. 15A, a line of pixels $C_{1,1}$, $C_{1,2}$, $C_{1,3}$, . . . is transferred to the intermediate data memory 41 and every second pixels $C_{1,2}$, $C_{1,4}$, . . . are removed to form a line of ½ size, to complete the horizontal ½ reduction.

Figure 15B:
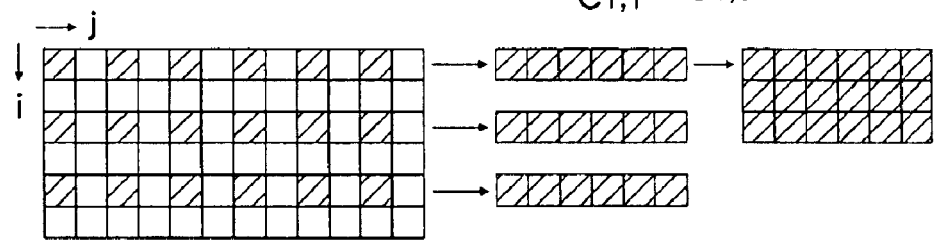
FIG. 15B is a view showing a simple algorithm for vertical ½ reduction.

FIG. 15B shows a simple algorithm to reduce ½ times an image in vertical and horizontal directions. A left part of FIG. 15B shows lines of pixels before vertical-horizontal ½ reduction, a central part of FIG. 15B shows lines of pixels after horizontal ½ reduction, and a right part of FIG. 15B shows lines of pixels after vertical ½ reduction. Although this example relates to ½ reduction, the same technique is applicable to reducing "1/integer" times an image. In FIG. 15B, a first line is transferred to the intermediate data memory 41, and every second pixels are removed to form a line of ½ size. This operation is repeated to reduce ½ times a given image in the horizontal direction. The pixels after the horizontal reduction are transferred to the video output buffer 5. This horizontal reduction process is conducted on every second lines, and resultant data is transferred to the video output buffer 5 to complete the vertical reduction process.

Figure 16:
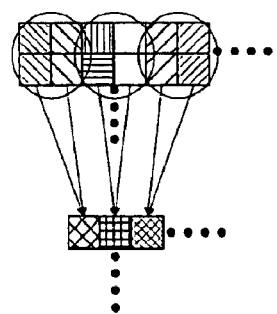
FIG. 16 is a view showing a bi-linear algorithm for vertical-horizontal ½ reduction.

FIG. 16 shows a bi-linear interpolation algorithm to reduce ½ times an image in vertical and horizontal directions. An upper part of FIG. 16 shows lines of pixels before vertical-horizontal ½ reduction and a lower part of FIG. 16 shows a line of pixels after the vertical-horizontal ½ reduction. At first, pixels in two lines are transferred to the intermediate data memory 41 to generate new pixels each derived from an average of four pixels, i.e., vertical and horizontal 2×2 pixels. This completes the vertical-horizontal ½ reduction process. The newly generated line is transferred to the video output buffer 5 to display a reduced image.

The video output controller shown in FIG. 12 requires a transfer synchronization mechanism to first transfer data to the filtering hardware 40. Thereafter, processes in the filtering hardware 40 are started. The processed data is transferred from the filtering hardware 40 to the video output buffer 5. These operations must be carried out in this order. Accordingly, the display controller 7 carries out not only DMA transfer but also activation of the filtering hardware 10. Namely, the DMA command list 16 allows two descriptions, one for the data transfer and another for the hardware activation.

Figure 17:
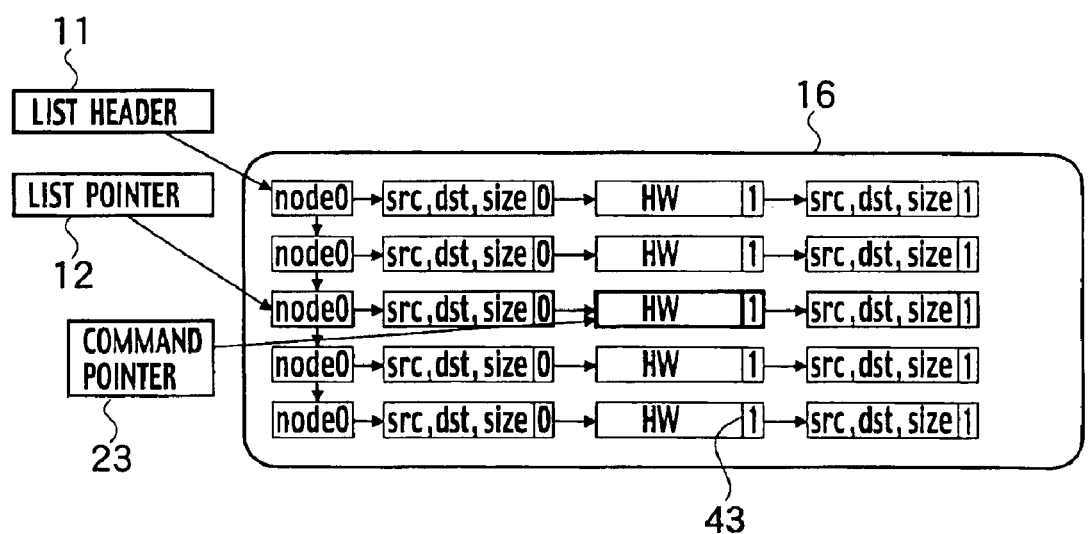
FIG. 17 is a view showing examples of block flags and DMA commands according to the third embodiment.

As shown in FIG. 17, the DMA command list 16 is additionally provided with block flags 43. The display controller 7 detects the end of a DMA command and executes the next DMA command. Since the display controller 7 controls transfer order, there is provided a mechanism to notify the display controller 7 of the end of processes carried out by the filtering hardware 40. In addition, the display controller 7 is provided with a mechanism to stop data transfer until the reception of the process end notification from the filtering hardware 40. According to the third embodiment, each element contained in the hierarchical DMA command list 16 has the block flag 43. When the block flag 43 is "1," the display controller 7 stops executing the corresponding DMA command until the reception of the process end notification from the filtering hardware 40. This arrangement is capable of conducting data transfer to the filtering hardware 40, activation of the filtering hardware 40, and transfer of processed data in predetermined order.

The third embodiment of the present invention is capable of outputting image data stored in the frame buffers FB1 to FB4 distributed in the second storage device 9 without collecting the frame buffers FB1 to FB4 to one location. This improves the degree of freedom of rendering conducted by application and provides, with a smaller memory space, the same effect as the related art that must collect the frame buffers to one location. According to the related art, the functions of the video output controller have entirely been realized by hardware. The third embodiment allows some of the functions to be replaced with software and a display resolution to be freely changed to another. The third embodiment can flexibly cope with frame buffers distributed in a memory.

As mentioned above, the present invention has been described through the first to third embodiments and modifications thereof, however, the descriptions and drawings that constitute a portion of this disclosure should not be perceived as those limiting the present invention. Various alternative embodiments and operational techniques will become clear to persons skilled in the art from this disclosure.

Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video output controller comprising:
a first storage device configured to store a DMA command list containing DMA commands;
a second storage device configured to secure frame buffers;
a video output buffer;
a DMA controller; and
a display controller comprising:
    a DMA command list processor configured to determine which of the DMA commands contained in the DMA command list must be issued;
an initialize signal port configured to receive an initialize signal for starting initialization;
a step signal port configured to receive a step signal for starting the issuance of the DMA command; and
an external signal processor configured to provide the DMA command list processor with a timing signal for issuing a DMA command according to the initialize signal and step signal.

2. The video output controller of claim 1, wherein:
the DMA command list processor is initialized when the initialize signal port receives the initialize signal;
the display controller transfers the DMA command to the DMA controller when the step signal port receives the step signal; and
the DMA controller transfers, in response to the DMA command, data stored in the frame buffers of the second storage device to the video output buffer.

3. The video output controller of claim 1, wherein the DMA command list processor comprises:
a list header configured to hold a start position of the DMA command list; and
a list pointer configured to hold the position of a DMA command to be issued next.

4. The video output controller of claim 3, wherein:
when the initialize signal port receives the initialize signal, the DMA command list processor copies the start position held in the list header to the list pointer; and when the step signal pointer receives the step signal, the DMA command list processor issues the DMA command indicated with the list pointer and updates the list pointer according to predetermined rules.

5. The video output controller of claim 4, wherein:
elements contained in the DMA command list have an identical size and are aligned in order of activation; and
the list pointer is updated by adding the element size to the list pointer.

6. The video output controller of claim 4, wherein:
the DMA command list has a hierarchical structure with a plurality of levels;
the list pointer indicates a node at a first level; and
a plurality of DMA commands following a node that is lower than the node at the first level are activated at the time of DMA command issuance.

7. The video output controller of claim 6, wherein:
order of activation of DMA commands at a second level and at levels lower than the second level is predetermined;
the DMA command list includes a block flag to control the activation of a hardware unit;
the display controller has a port to receive a third signal generated by the hardware unit; and
the display controller stops a DMA command for which the block flag is enabled until the third signal is received and releases the stopped DMA command upon detection of the third signal.

8. The video output controller of claim 3, wherein:
the DMA command list comprises DMA command data and a pointer for next DMA command data to be issued in response to the step signal; and
the list pointer is updated by rewriting the list pointer with the pointer for next DMA command data.

9. The video output controller of claim 1, wherein:
the external signal processor includes a counter configured to count the number of times of reception of the step signal, and when the counted number reaches a preset number of steps to complete the drawing of an image, the external signal processor sends an initialize timing signal to the DMA command list processor.

10. The video output controller of claim 9, wherein:
the DMA command list comprises DMA command data and a pointer for next DMA command data to be issued in response to the step signal; and
the list pointer is updated by rewriting the list pointer with the pointer for next DMA command data.

11. The video output controller of claim 9, wherein:
elements contained in the DMA command list have an identical size and are aligned in order of activation; and
the list pointer is updated by adding the element size to the list pointer.

12. A video output controller comprising:
a video output buffer;
a DMA controller; and
a display controller comprising:
    a DMA command list processor configured to determine which of the DMA commands contained in the DMA command list must be issued;
an initialize signal port configured to receive an initialize signal for starting initialization;
a step signal port configured to receive a step signal for starting the issuance of the DMA command; and an external signal processor configured to provide the DMA command list processor with a timing signal for issuing a DMA command according to the initialize signal and step signal.

13. The video output controller of claim 12, wherein:

the DMA command list processor is initialized when the initialize signal port receives the initialize signal;

the display controller transfers the DMA command to the DMA controller when the step signal port receives the step signal; and the DMA controller transfers, in response to the DMA command, data stored in the frame buffers of the second storage device to the video output buffer.

14. The video output controller of claim 12, wherein the DMA command list processor comprises:

a list header configured to hold a start position of the DMA command list; and a list pointer configured to hold the position of a DMA command to be issued next.

15. The video output controller of claim 14, wherein:

when the initialize signal port receives the initialize signal, the DMA command list processor copies the start position held in the list header to the list pointer; and when the step signal pointer receives the step signal, the DMA command list processor issues the DMA command indicated with the list pointer and updates the list pointer according to predetermined rules.

16. The video output controller of claim 15, wherein:

elements contained in the DMA command list have an identical size and are aligned in order of activation; and the list pointer is updated by adding the element size to the list pointer.

17. The video output controller of claim 14, wherein:

the DMA command list comprises DMA command data and a pointer for next DMA command data to be issued in response to the step signal; and the list pointer is updated by rewriting the list pointer with the pointer for next DMA command data.

18. The video output controller of claim 12, wherein:

the external signal processor includes a counter configured to count the number of times of reception of the step signal, and when the counted number reaches a preset number of steps to complete the drawing of an image, the external signal processor sends an initialize timing signal to the DMA command list processor.

19. A video card comprising:

a plurality of image processors configured to draw an image and generate image data to be stored in frame buffers;

a first storage device configured to store a DMA command list containing DMA commands;

a second storage device configured to secure the frame buffers;

a video output buffer;

a DMA controller; and a display controller comprising:

a DMA command list processor configured to determine which of the DMA commands contained in the DMA command list must be issued;

an initialize signal port configured to receive an initialize signal for starting initialization;

a step signal port configured to receive a step signal for starting the issuance of the DMA command; and an external signal processor configured to provide the DMA command list processor with a timing signal for issuing a DMA command according to the initialize signal and step signal.

20. The video card of claim 19, wherein:

the DMA command list processor is initialized when the initialize signal port receives the initialize signal;

the display controller transfers the DMA command to the DMA controller when the step signal port receives the step signal; and the DMA controller transfers, in response to the DMA command, data stored in the frame buffers of the second storage device to the video output buffer.

* * * * *